US009726822B1

(12) United States Patent
Ogawa (10) Patent No.: US 9,726,822 B1
(45) Date of Patent: Aug. 8, 2017

(54) OPTICAL INTEGRATED CIRCUIT

(71) Applicant: Fujikura Ltd., Tokyo (JP)

(72) Inventor: Kensuke Ogawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/441,611

(22) Filed: Feb. 24, 2017

(30) Foreign Application Priority Data

Mar. 29, 2016 (JP) ................................. 2016-064858

(51) Int. Cl.
| G02F 1/035 | (2006.01) |
| G02B 6/125 | (2006.01) |
| G02B 6/126 | (2006.01) |
| G02F 1/225 | (2006.01) |
| G02F 1/01 | (2006.01) |
| G02B 6/12 | (2006.01) |
| G02F 1/21 | (2006.01) |

(52) U.S. Cl.
CPC ............ *G02B 6/125* (2013.01); *G02B 6/126* (2013.01); *G02F 1/0123* (2013.01); *G02F 1/2257* (2013.01); *G02B 2006/1215* (2013.01); *G02F 2001/212* (2013.01); *G02F 2201/06* (2013.01); *G02F 2201/58* (2013.01); *G02F 2203/07* (2013.01)

(58) Field of Classification Search
CPC .. G02F 1/225; G02F 2001/212; G02F 1/2255; G02F 1/025; G02F 1/035; G02B 6/125; G02B 6/126
See application file for complete search history.

(56) References Cited

U.S. PATENT DOCUMENTS

| 7,106,919 B2 * | 9/2006 | Kochergin | ......... G01N 21/1717 385/12 |
| 7,212,712 B2 * | 5/2007 | Ramadan | ............... B82Y 20/00 385/18 |
| 2006/0204175 A1 * | 9/2006 | Laurent-Lund | ...... G02B 6/1228 385/43 |
| 2017/0017033 A1 | 1/2017 | Oka | |

FOREIGN PATENT DOCUMENTS

| JP | 5319468 B2 | 10/2013 |
| JP | 5697778 B1 | 4/2015 |

* cited by examiner

*Primary Examiner* — Jennifer Doan
(74) *Attorney, Agent, or Firm* — Westerman, Hattori, Daniels & Adrian, LLP (57) ABSTRACT

An optical integrated circuit includes: a mode conversion and branching section that launches light from a first optical waveguide to a second optical waveguide, converts light from the first optical waveguide into converted light, and launches the converted light to a third optical waveguide; an optical multiplexing and branching section that multiplexes lights from the second and third optical waveguides into one multiplexed light component, and branches the multiplexed light component into a light component to be input to a fourth optical waveguide and a light component to be input to a fifth optical waveguide; a phase modulation section that is provided in at least one of the fourth and fifth optical waveguides and modulates a phase of guided light; and an optical multiplexing section that multiplexes light components from the fourth and fifth optical waveguides into one light component.

9 Claims, 4 Drawing Sheets

OPTICAL INTEGRATED CIRCUIT

BACKGROUND OF THE INVENTION

Field of the Invention

The present invention relates to an optical integrated circuit.

Priority is claimed on Japanese Patent Application No. 2016-064858, filed on Mar. 29, 2016, the content of which is incorporated herein by reference.

Description of Related Art

In recent years, the amount of information transmitted by optical communication has increased. Measures, such as increasing the transmission rate and increasing the number of channels using wavelength multiplexing communication, have been taken in order to respond to an increase in the amount of information. In particular, in a next-generation 100-Gbps digital coherent transmission technique for achieving high-speed information communication, a polarization multiplexing system that transmits information in two polarization modes in which the electric fields are orthogonal to each other is used. In the polarization multiplexing system, the amount of information per unit time can be twice more than that in an optical transmission system using single polarization mode.

In an optical modulation system for high-speed communication including the polarization multiplexing system, an optical integrated circuit using a planar optical waveguide element has been developed in order to reduce a size or costs.

In particular, a technique has been improved which converts an incident optical wave in arbitrary polarization state and in single mode into an optical wave in specific linear polarization and performs optical signal processing in the planar optical waveguide element, in order to achieve a high-speed and high-capacity optical fiber network.

Japanese Patent No. 5319468 discloses a structure in which a degree-of-polarization monitor or an optical signal-to-noise ratio (OSNR) monitor is configured using an optical circuit formed by an interferometer and an arbitrary polarized optical wave of incident light is converted into a specific linearly polarized optical wave. In particular, in an optical circuit disclosed in Japanese Patent No. 5319468, a polarization beam splitter is provided in an optical branching section, different polarized optical waves are output to two arm waveguides, and a polarization rotator that rotates a polarization plane 90° is inserted into one of the arm waveguides.

SUMMARY OF THE INVENTION

However, in the structure of the optical circuit disclosed in Japanese Patent No. 5319468, since the polarization rotator is provided, there is a concern that the length of each arm waveguide of a symmetric Mach-Zehnder interferometer in a front stage will be redundant. In this case, it will be difficult to reduce the length of the arm waveguides. Therefore, it will be difficult to reduce the footprint of the optical circuit and to reduce the overall size of the circuit. In addition, it will be difficult to reduce the length of the arm waveguides, and it will be difficult to remove a phase error caused by, for example, the fabrication error of the Mach-Zehnder interferometer or the film thickness distribution of a waveguide core. Therefore, there is a concern that manufacturing yield will decrease and manufacturing costs will increase. In addition, it will be difficult to reduce temperature dependence and to ensure the stable operation of an optical element.

In the optical circuit disclosed in Japanese Patent No. 5319468, the intensity of an optical signal output from at least one output port is detected to control an optical phase adjuster. When an optical element, such as a degree-of-polarization monitor or an OSNR monitor, is configured on the basis of the above-mentioned principle and structure, there is a concern that a reduction in the footprint of the optical element will be limited by a photodetector. In addition, it is considered that the introduction of the photodetector causes an increase in the manufacturing costs of the optical element.

In the optical circuit disclosed in Japanese Patent No. 5319468, if the photodetector is introduced, an electronic circuit for driving and controlling the photodetector is required. In addition, dimensions and costs increase due to the electronic circuit and power for driving the electronic circuit is required. As a result, it will be difficult to reduce power consumption.

Therefore, in the optical circuit disclosed in Japanese Patent No. 5319468, it will be difficult to reduce the footprint of the optical circuit that performs optical signal processing, to reduce manufacturing costs, to ensure operation stability, and to reduce power consumption.

The invention has been made in view of the above-mentioned problems and an object of the invention is to provide a polarization conversion element and an optical integrated circuit, with which reduction in size, manufacturing cost and power consumption and improve stability of operation stability are achieved.

An optical integrated circuit according to an aspect of the invention includes: a first optical waveguide that guides light in an arbitrary polarization state; a mode conversion and branching section that is connected to an output end of the first optical waveguide, launches light in a $TE_0$ mode from the first optical waveguide to a second optical waveguide, without converting the light in the $TE_0$ mode, converts light in a $TM_0$ mode from the first optical waveguide into light in the $TE_0$ mode, and launches the converted light in the $TE_0$ mode to a third optical waveguide; an optical multiplexing and branching section that is connected to the second optical waveguide and the third optical waveguide, multiplexes light from the second optical waveguide and light from the third optical waveguide into one multiplexed light component, and branches the multiplexed light component into a light component to be input to a fourth optical waveguide and a light component to be input to a fifth optical waveguide; a phase modulation section that is provided in at least one of the fourth optical waveguide and the fifth optical waveguide and modulates a phase of guided light using an electric signal; and an optical multiplexing section that is connected to the fourth optical waveguide and the fifth optical waveguide and multiplexes light components from the fourth optical waveguide and the fifth optical waveguide into one light component.

The mode conversion and branching section may include: a mode conversion section that is connected to the output end of the first optical waveguide and converts the light in the $TM_0$ mode from the first optical waveguide into light in a $TE_n$ (n is a natural number) mode; and a mode branching section that is provided in a stage behind the mode conversion section, launches light in the $TE_0$ mode from the mode conversion section to the second optical waveguide, without converting the light in the $TE_0$ mode, and launches the light in the $TE_n$ mode from the mode conversion section to the third optical waveguide, thereby converting the light in the $TE_n$ mode into light in the $TE_0$ mode.

The optical integrated circuit according to the above-mentioned aspect may further include a phase adjustment section that is provided in at least one of the second optical waveguide and the third optical waveguide and adjusts a phase of light to be input to the optical multiplexing and branching section.

The optical integrated circuit according to the above-mentioned aspect may further include a monitoring section that detects a photocurrent generated in the phase modulation section.

The optical integrated circuit according to the above-mentioned aspect may further include a bias power supply and a ground electrode that are electrically connected to the phase modulation section. The monitoring section may be provided between the phase modulation section and the bias power supply or between the phase modulation section and the ground electrode.

The optical integrated circuit according to the above-mentioned aspect may further include a feedback mechanism that applies a DC voltage or a DC current to the phase adjustment section according to the intensity of the photocurrent detected by the monitoring section to perform feedback control.

An optical path length of the second optical waveguide may be different from an optical path length of the third optical waveguide.

The optical multiplexing section may include at least one output end. In a case in which the first optical waveguide guides continuous light, an optical signal that is modulated by the phase modulation section may be output from the at least one output end of the optical multiplexing section.

The optical multiplexing section may include at least two output ends. In a case in which the first optical waveguide guides an optically modulated optical signal, one of the output ends of the optical multiplexing section may be selected and an optical signal that is modulated by the phase modulation section may be output from the selected output end.

According to the above-mentioned aspect of the invention, it is possible to reduce the footprint of the optical integrated circuit that converts an arbitrary polarized optical wave of input light into a specific linearly polarized optical wave and performs optical modulation and to improve mass productivity.

DETAILED DESCRIPTION OF THE INVENTION

First Embodiment

Figure 1:
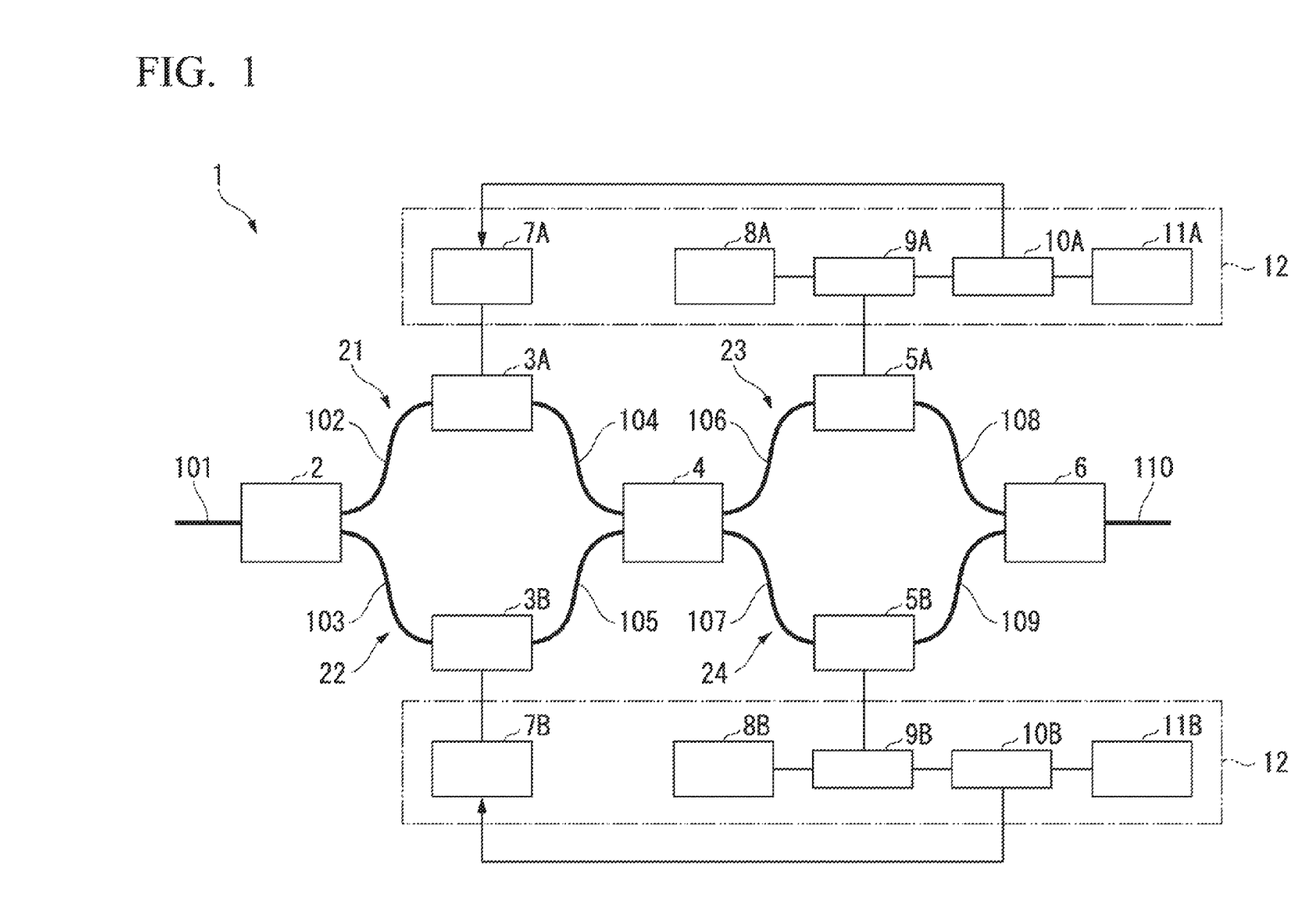
FIG. 1 is a diagram illustrating the structure of an optical integrated circuit according to a first embodiment of the invention.

FIG. 1 is a diagram illustrating the structure of an optical integrated circuit 1 according to a first embodiment of the invention.

The optical integrated circuit 1 includes optical waveguides 101 to 110, a mode conversion and branching section 2, an optical multiplexing and branching section (first optical multiplexing and branching section) 4, phase modulation sections 5A and 5B, and an optical multiplexing section 6.

The polarization state of optical waves which are incident on the optical integrated circuit 1 is represented on the basis of light in two linear polarization states that are orthogonal to each other. The two linearly polarization states are referred to as a transverse-electric (TE) mode and a transverse-magnetic (TM) mode.

The optical integrated circuit 1 according to this embodiment is formed on a substrate having a flat plane. The flat plane of the substrate is referred to as a horizontal plane. In the TE mode, the electric field of optical waves is parallel to the horizontal plane. In contrast, in the TM mode, the electric field of optical waves is perpendicular to the horizontal plane. Optical waves that are incident on the optical integrated circuit 1 illustrated in FIG. 1 are resolved into optical waves in the TE mode and optical waves in the TM mode. The optical waves that are incident on the optical integrated circuit 1 illustrated in FIG. 1 from an input end of the optical waveguide 101 are propagated through the optical waveguide 101 as guided light in a base-order, that is, zero-order TE ($TE_0$) mode and guided light in a base-order, that is, zero-order TM ($TM_0$) mode. Here, light that is incident on the optical integrated circuit 1 illustrated in FIG. 1 is continuous light and light in the $TE_0$ mode and light in the $TM_0$ mode are also continuous light.

The $TE_0$ mode is a mode with the highest effective refractive index among the TE modes. The $TM_0$ mode is a mode with the highest effective refractive index among the TM modes.

The optical waveguide (first optical waveguide) 101 can guide light in an arbitrary polarization state and an output end of the optical waveguide 101 is connected to an input port of the mode conversion and branching section 2.

The mode conversion and branching section 2 is connected to the output end of the optical waveguide 101 and launches light in the $TE_0$ mode from the optical waveguide 101 to the optical waveguide 102, without converting the light in the $TE_0$ mode. The mode conversion and branching section 2 converts light in the $TM_0$ mode from the optical waveguide 101 into light in the $TE_0$ mode and launches (branches) the converted light to the optical waveguide 103.

An output end of the optical waveguide 102 is connected to an input end of a phase adjustment section 3A. An output end of the phase adjustment section 3A is connected to an input end of the optical waveguide 104. The optical multiplexing and branching section 4 includes two input ports. An output end of the optical waveguide 104 is connected to one input port of the optical multiplexing and branching section 4. A path from the input end of the optical waveguide 102 to the output end of the optical waveguide 104 forms one arm waveguide (second optical waveguide) 21 of a Mach-Zehnder interferometer in a first stage, that is, a front stage.

An output end of the optical waveguide 103 is connected to an input end of a phase adjustment section 3B. An output end of the phase adjustment section 3B is connected to an input end of the optical waveguide 105. An output end of the optical waveguide 105 is connected to the other input port of the optical multiplexing and branching section 4. A path from the input end of the optical waveguide 103 to the output end of the optical waveguide 105 forms the other arm waveguide (third optical waveguide) 22 of the Mach-Zehnder interferometer in the front stage.

The phase adjustment sections 3A and 3B are supplied with, for example, a DC voltage or a DC current and adjust the phase of two light components in the $TE_0$ mode which are incident on the optical multiplexing and branching section 4.

In this embodiment, the phase adjustment sections are provided in two arm waveguides 21 and 22. However, the invention is not limited thereto. The phase adjustment section may be provided in only one of the two arm waveguides 21 and 22. In addition, for example, the phase adjustment section may not be provided as long as an appropriate optical path difference can be given to the two arm waveguides 21 and 22 to remove the phase difference between two light components in the $TE_0$ mode.

The optical multiplexing and branching section 4 includes two input ports and multiplexes two light components in the $TE_0$ mode launched from the optical waveguide 104 and the optical waveguide 105 into one light component.

In addition, the optical multiplexing and branching section 4 includes two launch ports. One launch port of the optical multiplexing and branching section 4 is connected to an input end of the optical waveguide 106 and the other launch port of the optical multiplexing and branching section 4 is connected to an input end of the optical waveguide 107. Therefore, the optical multiplexing and branching section 4 branches the multiplexed light into light components to be input to the optical waveguide 106 and the optical waveguide 107.

The optical multiplexing and branching section 4 branches the multiplexed light in the $TE_0$ mode into two light components, without converting the mode of light. It is preferable that the branching is performed at an equal ratio. When light launched from the optical multiplexing and branching section 4 is equally branched, it is possible to control the turn-on and turn-off of light launched from the optical multiplexing section 6 which will be described below.

An output end of the optical waveguide 106 is connected to an input end of the phase modulation section 5A. An output end of the phase modulation section 5A is connected to an input end of the optical waveguide 108. The optical multiplexing section 6 includes two input ports. An output end of the optical waveguide 108 is connected to one input end of the optical multiplexing section 6. A path from the input end of the optical waveguide 106 to the output end of the optical waveguide 108 forms one arm waveguide (fourth optical waveguide) 23 of a Mach-Zehnder interferometer in a second stage, that is, in a rear stage.

An output end of the optical waveguide 107 is connected to an input end of the phase modulation section 5B. An output end of the phase modulation section 5B is connected to an input end of the optical waveguide 109. An output end of the optical waveguide 109 is connected to the other input end of the optical multiplexing section 6. A path from the input end of the optical waveguide 107 to the output end of the optical waveguide 109 forms the other arm waveguide (fifth optical waveguide) 24 of the Mach-Zehnder interferometer in the rear stage.

In the phase modulation sections 5A and 5B, for example, the phase of two light components in the $TE_0$ mode to be input to the optical multiplexing section 6 is adjusted by an input AC modulation electric signal or an applied DC reverse bias.

In this embodiment, the phase modulation sections are provided in two arm waveguides. However, the invention is not limited thereto. The phase modulation section may be provided in only one of the two arm waveguides.

The optical multiplexing section 6 multiplexes the light components launched from the optical waveguide 108 and the optical waveguide 109 into one light component.

An output end of the optical multiplexing section 6 is connected to an input end of the optical waveguide 110. In this embodiment, an output end of the optical waveguide 110 is a launch port of the optical integrated circuit 1.

The phase of two light components in the $TE_0$ mode to be input to the optical multiplexing section 6 is adjusted by the AC modulation electric signal input to the phase modulation sections 5A and 5B or the DC reverse bias applied to the phase modulation sections 5A and 5B. Therefore, it is possible to control the turn-on and turn-off of an optical signal output from the optical multiplexing section 6. This uses the interference between two light components in the $TE_0$ mode in the optical multiplexing section 6.

The use of the above-mentioned structure makes it possible to convert all of the modes of light input to the Mach-Zehnder interferometer into the $TE_0$ mode in the stage before the Mach-Zehnder interferometer. Therefore, for example, it is not necessary to provide a polarization rotator in the Mach-Zehnder interferometer.

As a result, it is possible to reduce the footprint of the optical integrated circuit 1 and to improve mass productivity.

[Structure of Mode Conversion and Branching Section 2]

Figure 2:
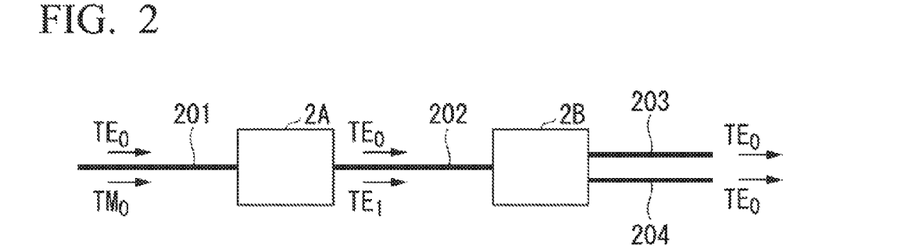
FIG. 2 is an enlarged view illustrating a mode conversion and branching section.

An example of the mode conversion and branching section 2 will be described in detail with reference to FIG. 2.

The output end of the optical waveguide 101 is connected to an input end of an optical waveguide 201 in the mode conversion and branching section 2.

The input end of the optical waveguide 201 forms the input port of the mode conversion and branching section 2. An output end of the optical waveguide 201 is connected to an input end of a mode conversion section 2A. The mode conversion section 2A converts only guided light in the $TM_0$ mode into guided light in a high-order TE mode, for example, a $TE_1$ mode and the converted guided light is launched from an output end of the mode conversion section 2A to an optical waveguide 202. In contrast, guided light in the $TE_0$ mode is not converted and is launched from the output end of the mode conversion section 2A to the optical waveguide 202.

The output end of the mode conversion section 2A is connected to an input end of the optical waveguide 202. An output end of the optical waveguide 202 is connected to an input end of the mode branching section 2B.

The mode branching section 2B includes two launch ports and only the guided light in the $TE_0$ mode is launched from one launch port to an optical waveguide 203. Only the guided light in the $TE_1$ mode is branched and converted into light in the $TE_0$ mode, and the converted light is launched from the other launch port to an optical waveguide 204. An output end of the optical waveguide 203 is connected to the optical waveguide 102 illustrated in FIG. 1. An output end of the optical waveguide 204 is connected to the optical waveguide 103 illustrated in FIG. 1.

The mode which is converted from the guided light in the $TM_0$ mode by the mode conversion section 2A is not limited to the $TE_1$ mode and may be a high-order TE mode ($TE_n$ mode (here, n is a natural number)).

As the order of the mode increases, the width of the waveguide needs to increase. However, it will be difficult to increase the width of the waveguide in terms of the design. Therefore, it is preferable to convert the mode into the $TE_1$ mode in terms of the ease of the design.

In contrast, when the orders of the modes before and after conversion by the mode branching section 2B are close to each other, there is a concern that light will not be branched and light components in the high-order modes will be mixed in an optical waveguide 203, 204. For this reason, for example, it is preferable that the mode conversion section 2A converts the $TM_0$ mode into a mode, of which the order is far apart from the order of the $TM_0$ mode, such as a $TE_2$ mode, in order to increase the branching ratio of the mode branching section 2B, thereby increasing an extinction ratio.

For example, the structure disclosed in Japanese Patent No. 5697778 can be used as a mode conversion section and a mode branching section using a waveguide circuit.

As such, in this embodiment, first, polarization mode conversion is performed and then mode branching and conversion using single polarization are performed. In this way, polarization mode conversion is completed before guided light is input to each arm of the Mach-Zehnder interferometer.

Therefore, it is possible to omit the polarization rotator provided in the arm waveguide of the optical circuit according to the related art and to reduce the length of each arm waveguide. This structure operates in a wide wavelength band. For example, this structure can operate in the entire range of the C and L bands of optical communication and is suitable for optical information processing in a wide wavelength band.

Light in the $TE_0$ mode is guided by each of the arm waveguides 21 and 22. It is necessary to remove a phase difference accompanied by mode conversion and mode branching in order to remove a phase difference between the output ports of the mode conversion and branching section 2.

In this case, the optical path length of the arm waveguide 21 may be different from the optical path length of the arm waveguide 22. In this case, the optical path lengths of the arm waveguides 21 and 22 are not equal to each other and the Mach-Zehnder interferometer in the front stage is asymmetric.

In particular, in this embodiment, it is preferable that the optical path length of the arm waveguide 22 which guides light in the $TE_0$ mode converted from light in a high-order mode by the mode conversion and branching section 2 increases to remove the phase difference accompanied by mode conversion and mode branching.

In this embodiment, the phase difference accompanied by mode conversion and mode branching may be removed by the phase adjustment sections 3A and 3B.

As described above, when the optical path length of the arm waveguide 21 and the optical path length of the arm waveguide 22 are different from each other to remove the phase difference, it is possible to omit the phase adjustment sections 3A and 3B or to reduce power required to drive the phase adjustment sections 3A and 3B, as compared to a case in which the optical path lengths are equal to each other. Therefore, the structure in which the optical path length of the arm waveguide 21 and the optical path length of the arm waveguide 22 are different from each other makes it possible to reduce power consumption.

[Phase Control by Feedback Mechanism 12]

In this embodiment, the Mach-Zehnder interferometer in the rear stage is an interferometer for optical modulation.

In a case in which intensity modulation is performed, it is necessary to increase the extinction ratio of modulated light output from the launch port in order to improve the quality of an optical signal. It is preferable to perform control such that the intensities of guided light components input to the arm waveguides 23 and 24 of the Mach-Zehnder interferometer in the rear stage are equal to each other, in order to increase the extinction ratio.

In this embodiment, the feedback mechanism 12 illustrated in FIG. 1 may adjust the phase of light in at least one of the phase adjustment sections 3A and 3B to control the phase of light in the Mach-Zehnder interferometer in the front stage. In this case, it is possible to adjust the intensity of light input to the arm waveguides 23 and 24 of the Mach-Zehnder interferometer in the rear stage.

The feedback mechanism 12 includes control sections 7A and 7B, electric signal sources 8A and 8B, bias tees 9A and 9B, monitoring sections 10A and 10B, and bias power supplies 11A and 11B.

The control sections 7A and 7B apply a DC voltage or a DC current to the phase adjustment sections 3A and 3B to adjust the phase of light propagated through the phase adjustment sections 3A and 3B, respectively.

In a case in which the phase adjustment sections 3A and 3B are, for example, optical waveguides having a PN junction that can be driven by a reverse bias, a DC voltage can be applied to adjust the phase. In a case in which the phase adjustment sections 3A and 3B are, for example, optical waveguides having a PN junction that can be driven by a forward bias or thermo-optical waveguides having a heater, a DC current can be applied to adjust the phase.

A modulation electric signal is applied to at least one of the phase modulation sections 5A and 5B in order to generate an optically modulated signal. The phase modulation sections 5A and 5B may be optical waveguides having a reverse-bias-driven PN junction in order to perform optical modulation at a symbol rate that is equal to or higher than $10 \, G_{baud}$.

The electric signal sources 8A and 8B input an AC modulation electric signal to the phase modulation sections 5A and 5B through the bias tees 9A and 9B, respectively.

The bias power supplies 11A and 11B apply a DC reverse bias to the phase modulation sections 5A and 5B through the bias tees 9A and 9B, respectively.

When guided light is propagated through a reverse-biased PN junction, a photocurrent is generated by two-photon absorption.

The monitoring sections 10A and 10B which are connected to the phase modulation sections 5A and 5B, respectively, detect the photocurrent. The detection results are fed back to the control sections 7A and 7B which are connected to the monitoring sections 10A and 10B, respectively, to control the intensity of guided light to be input to the arm waveguides 23 and 24 of the Mach-Zehnder interferometer in the rear stage.

Each of the monitoring sections 10A and 10B includes, for example, an ammeter and a control electric circuit (not illustrated).

A control electric signal is fed back to the control sections 7A and 7B to adjust the DC voltage or the DC current to be applied such that the same amount of current flows through the monitoring sections 10A and 10B. In this way, the intensities of guided light components input to the arm waveguides 23 and 24 of the Mach-Zehnder interferometer in the rear stage can be equal to each other.

In this embodiment, the phase modulation sections 5A and 5B can also function as photodetectors that monitor the intensity of guided light in addition to generating a modulated optical signal. Therefore, it is not necessary to introduce a photodetector, unlike the related art. As a result, it is possible to reduce the footprint of the optical integrated circuit and to reduce manufacturing costs.

A method for performing control such that the intensities of guided light components input to the arm waveguides 23 and 24 of the Mach-Zehnder interferometer in the rear stage are equal to each other will be described below.

It is assumed that the electric fields of light components which are input to the optical waveguides 102 and 103 from two launch ports of the mode conversion and branching section 2 are $E_1$ and $E_2$, respectively, and the phases generated by the phase adjustment sections 3A and 3B are $\phi_1$ and $\phi_2$, respectively. In this case, the electric fields $E_3$ and $E_4$ of light components which are input to two input ports of the optical multiplexing and branching section 4 are represented by the following Expression (1).

$$\begin{bmatrix} E_3 \\ E_4 \end{bmatrix} = \begin{bmatrix} e^{-i\phi_1} & 0 \\ 0 & e^{-i\phi_2} \end{bmatrix} \begin{bmatrix} E_1 \\ E_2 \end{bmatrix} = \begin{bmatrix} E_1 e^{-i\phi_1} \\ E_2 e^{-i\phi_2} \end{bmatrix} \quad (1)$$

In addition, the electric fields $E_5$ and $E_6$ of light components which are input to the optical waveguides 106 and 107 from two launch ports of the optical multiplexing and branching section 4 are represented by the following Expression (2).

$$\begin{bmatrix} E_5 \\ E_6 \end{bmatrix} = \frac{\sqrt{2}}{2} \begin{bmatrix} 1 & -i \\ -i & 1 \end{bmatrix} \begin{bmatrix} E_3 \\ E_4 \end{bmatrix} = \frac{\sqrt{2}}{2} \begin{bmatrix} E_1 e^{-i\phi_1} - i E_2 e^{-i\phi_2} \\ -i E_1 e^{-i\phi_1} + E_2 e^{-i\phi_2} \end{bmatrix} \quad (2)$$

In a case in which the intensities of guided light components that are input to the arm waveguides 23 and 24 of the Mach-Zehnder interferometer in the rear stage are equal to each other, the following Expression (3) is satisfied.

$$|E_5| = |E_6| \quad (3)$$

The condition represented by the following Expression (4) is obtained from the phases generated by the phase adjustment sections 3A and 3B.

$$\phi_1 - \phi_2 = 2N\pi \quad (4)$$

Here, N is an integer. Since a periodicity of $2\pi$ is negligible, N is 0. When the overall intensity of light is standardized to 1, $E_5$ and $E_6$ are represented by the following Expression (5).

$$\begin{bmatrix} E_5 \\ E_6 \end{bmatrix} = \frac{\sqrt{2}}{2} \begin{bmatrix} 1 \\ e^{-i\frac{\pi}{2}} \end{bmatrix} \quad (5)$$

When appropriate control electric signals are output to the control sections 7A and 7B such that Expression (5) is satisfied, it is possible to make the intensities of the guided light components input to the arm waveguides 23 and 24 of the Mach-Zehnder interferometer in the rear stage equal to each other.

As such, the intensities of the guided light components input to the arm waveguides 23 and 24 of the Mach-Zehnder interferometer in the rear stage are controlled by the feedback mechanism 12 to further stabilize the operation of the optical integrated circuit 1. In addition, the phase modulation sections 5A and 5B can detect the intensity of guided light, in addition to generating a modulated optical signal. Therefore, it is not necessary to provide a separate device for detecting the intensity of guided light.

[Structure of Phase Modulation Sections 5A and 5B]

Figure 3:
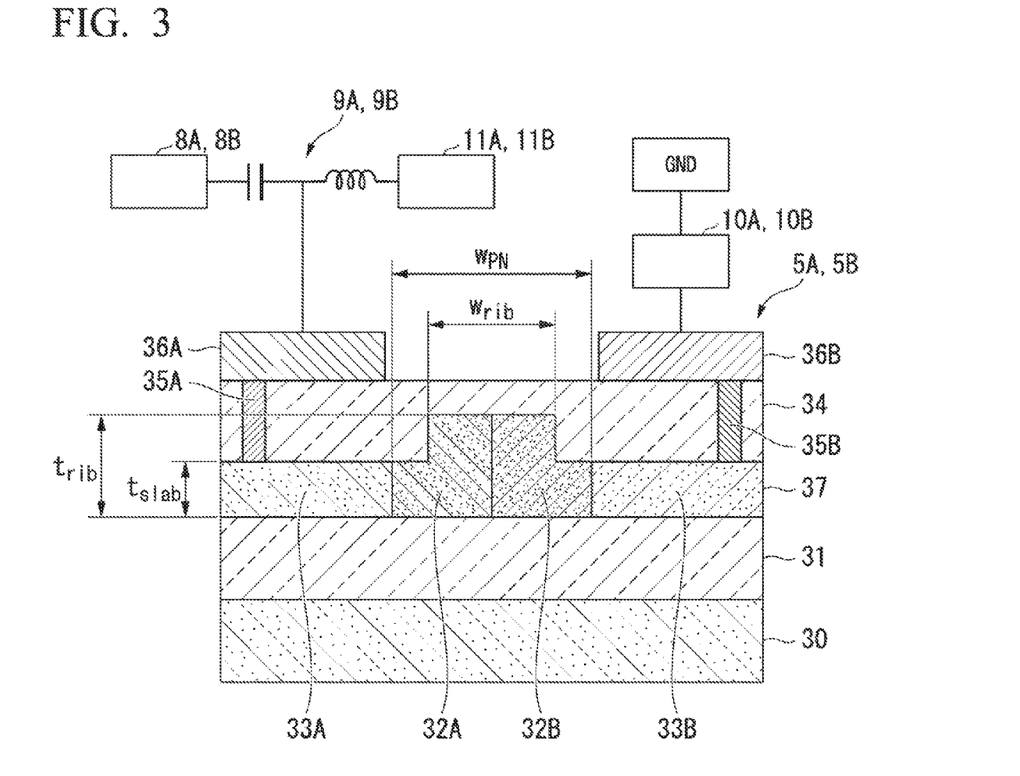
FIG. 3 is a cross-sectional view illustrating a phase modulation section.

FIG. 3 is a diagram illustrating the cross-sectional structure of the phase modulation sections 5A and 5B.

As illustrated in FIG. 3, rib waveguides are formed in the phase modulation sections 5A and 5B.

A substrate 30 is made of undoped silicon.

For example, a lower clad 31 that is made of silica and has a thickness of 2 μm is provided on an upper surface (horizontal plane) of the substrate 30.

A silicon layer 37 having a rib portion is provided on the lower clad 31. A substrate, a BOX layer, and a silicon-on-insulator (SOI) layer of an SOI wafer are used as the substrate 30, the lower clad 31, and the silicon layer 37, respectively.

The rib portion is a main portion of a silicon core which propagates light in a fundamental mode. A slab portion is connected to the side of the rib portion.

In this embodiment, the rib waveguide includes the rib portion and the slab portion. It is preferable that the width $W_{rib}$ of the rib portion is in the range of about 500 nm to 600 nm. The thickness $t_{rib}$ of the rib portion from the bottom of the core is, for example, 220 nm and the thickness $t_{slab}$ of the slab portion is, for example, 95 nm.

The core includes a P-type semiconductor portion 32A and an N-type semiconductor portion 32B forming a PN diode. A PN junction is formed at the boundary between the P-type semiconductor portion 32A and the N-type semiconductor portion 32B.

The doping density of the P-type semiconductor portion 32A and the N-type semiconductor portion 32B is, for example, about $10^{18}$ cm$^{-3}$.

A P-type conductor portion 33A is connected to a region of the P-type semiconductor portion 32A which is opposite to the side where the PN junction is formed. An N-type conductor portion 33B is connected to a region of the N-type semiconductor portion 32B which is opposite to the side where the PN junction is formed.

The P-type conductor portion 33A and the N-type conductor portion 33B need to be heavily doped in order to reduce electric resistance which is the cause of hindering an increase in processing speed and the doping density of the P-type conductor portion 33A and the N-type conductor portion 33B is, for example, about $10^{20}$ cm$^{-3}$.

The gap $W_{PN}$ between the P-type conductor portion 33A and the N-type conductor portion 33B is, for example, about 2 μm and the midpoint of $W_{PN}$ is substantially at the center of the rib portion.

For example, an upper clad 34 that is made of silica and has a thickness of 1 μm to 2 μm is provided on the rib portion and the slab portion. The upper clad 34 is manufactured by depositing silica using a manufacturing method such as CVD.

One end of a vertical metal connection portion 35A is connected to the upper surface of the P-type conductor portion 33A. One end of a vertical metal connection portion 35B is connected to the upper surface of the N-type conductor portion 33B.

The vertical metal connection portions 35A and 35B pass through the upper clad 34. Metal electrodes 36A and 36B are connected to the other ends of the vertical metal connection portions 35A and 35B, respectively.

Optical waveguides having the same cross-sectional structure as described above can be used as the phase adjustment sections 3A and 3B. However, the phase adjustment sections 3A and 3B are not limited to this structure and may be thermo-optical waveguides having a heater.

In a case in which a photocurrent generated by two-photon absorption when guided light is propagated through the P-type semiconductor portion 32A and the N-type semiconductor portion 32B is monitored, the bias tees 9A and 9B and the monitoring sections 10A and 10B may be disposed as illustrated in FIG. 3.

In FIG. 3, the bias tees 9A and 9B are connected to the metal electrode 36A which is connected to the P-type semiconductor portion 32A. The monitoring sections 10A and 10B are connected to the metal electrode 36B which is connected to the N-type semiconductor portion 32B.

The input of electric signals or the application of bias voltages from the bias tees 9A and 9B connected to the electric signal sources 8A and 8B and the bias power supplies 11A and 11B to the phase modulation sections 5A and 5B is performed by the above-mentioned configuration.

In FIG. 3, the monitoring sections 10A and 10B are provided on the sides of the phase modulation sections 5A and 5B which are close to a ground electrode GND (between the phase modulation sections 5A and 5B and the ground electrode GND) and can detect the photocurrent generated by two-photon absorption.

However, as illustrated in FIG. 1, the monitoring sections 10A and 10B may be provided between the bias tees 9A and 9B (phase modulation sections 5A and 5B) and the bias power supplies 11A and 11B, respectively. In this case, the monitoring sections 10A, and 10B can also detect the photocurrent generated by two-photon absorption.

In this way, the phase modulation sections 5A and 5B can detect the intensity of guided light, in addition to generating a modulated optical signal.

[Connection Between Rectangular Waveguide and Rib Waveguide]

In this embodiment, the optical waveguides 101 to 117 are rectangular waveguides. The width of the rectangular waveguide is equal to $W_{rib}$. The thickness of the rectangular waveguide is equal to $t_{rib}$.

Figure 4:
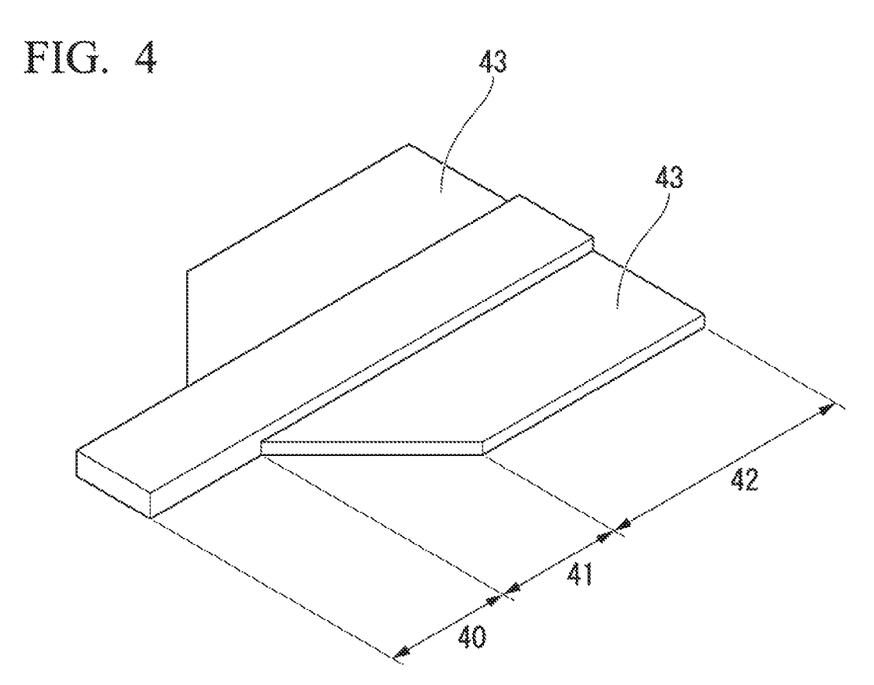
FIG. 4 is a perspective view illustrating a rib waveguide connected to a rectangular waveguide.

It is necessary to connect the rectangular waveguides forming the optical waveguides 101 to 117 and the rib waveguides forming the phase adjustment sections 3A and 3B or the phase modulation sections 5A and 5B in order to form the optical integrated circuit 1. FIG. 4 is a perspective view schematically illustrating a rib waveguide connected to a rectangular waveguide.

A rectangular waveguide 40 has the same width and thickness as a rib waveguide 42. In a transition region 41 from the rectangular waveguide 40 to the rib waveguide 42, the width of a slab portion 43 gradually increases from zero and the slab portion 43 is connected to the rib waveguide 42.

In the transition region 41, the width of the slab portion 43 increases linearly or quadratically along the propagation direction of light. In a case in which the width of the slab portion 43 is linearly changed, it is possible to easily design waveguides. In contrast, in a case in which the width of the slab portion 43 is quadratically changed, it is possible to further reduce light loss.

The length of the transition region 41 needs to be sufficiently greater than the wavelength of light. For example, the length of the transition region 41 is about 20 μm. However, the length of the transition region 41 is not particularly limited.

Second Embodiment

Figure 5:
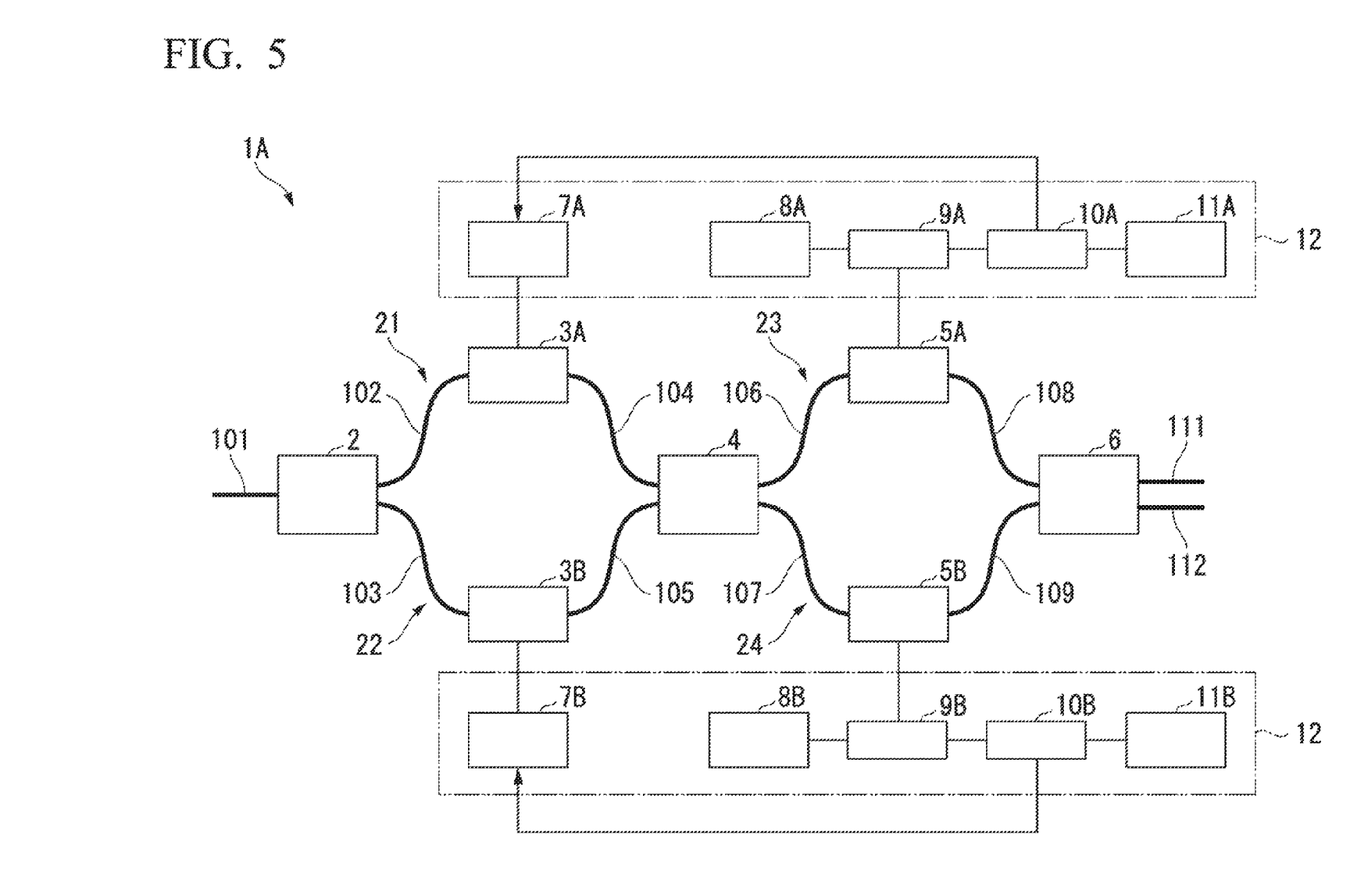
FIG. 5 is a diagram illustrating the structure of an optical integrated circuit according to a second embodiment of the invention.

FIG. 5 is a diagram illustrating the structure of an optical integrated circuit 1A according to a second embodiment of the invention. Only components that are different from those in the structure of the optical integrated circuit 1 according to the first embodiment are denoted by new reference numerals and will be described.

In the optical integrated circuit 1A according to the second embodiment, an optical-switch-type optical integrated circuit that converts an arbitrary polarized optical wave of incident light into a specific linearly polarized optical wave and switches an optical signal to different paths is formed on the basis of a silicon waveguide.

In this embodiment, an optical wave that is input to an optical waveguide 101 is not continuous light, but is an optically modulated optical signal. This embodiment differs from the first embodiment in that a second optical multiplexing and branching section 16 is provided instead of the optical multiplexing section 6.

The second optical multiplexing and branching section 16 includes two input ports and two launch ports.

An output end of an optical waveguide 108 is connected to one input end of the second optical multiplexing and branching section 16 and an output end of an optical waveguide 109 is connected to the other input end of the second optical multiplexing and branching section 16.

One output end of the second optical multiplexing and branching section 16 is connected to an input end of an optical waveguide 111 and the other output end of the second optical multiplexing and branching section 16 is connected to an input end of an optical waveguide 112.

Phase adjustment sections 3A and 3B and phase modulation sections 5A and 5B have the same cross-sectional structures as those in the first embodiment. An optical signal is output from a output end of the optical waveguide 111 or an output end of the optical waveguide 112.

An AC modulation electric signal that is input to the phase modulation sections 5A and 5B or a DC reverse bias that is applied to the phase modulation sections 5A and 5B is controlled to adjust the phase of two light components in the $TE_0$ mode which are input to the second optical multiplexing and branching section 16. In this way, for example, it is possible to select to which of the optical waveguide 111 and the optical waveguide 112 the optical signal is output from the second optical multiplexing and branching section 16. In addition, the AC modulation electric signal that is input to the phase modulation sections 5A and 5B or the DC reverse bias that is applied to the phase modulation sections 5A and 5B is controlled to output optical signals to the optical waveguide 111 and the optical waveguide 112 at an arbitrary branching ratio.

Similarly to the first embodiment, this uses the interference between two light components in the $TE_0$ mode in the second optical multiplexing and branching section 16.

According to the above-described embodiment, it is possible to reduce the footprint of an optical-switch-type optical integrated circuit that converts an arbitrary polarized optical signal of incident light into a specific linearly polarized optical wave and switches the optical signal to different paths and to improve mass productivity.

The optical integrated circuits according to the invention have been described above. However, the invention is not limited to the above-mentioned examples and various modifications and changes of the invention can be made without departing from the scope and spirit of the invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical integrated circuit comprising:
   a first optical waveguide that guides light in an arbitrary polarization state;
   a mode conversion and branching section that is connected to an output end of the first optical waveguide, launches light in a $TE_0$ mode from the first optical waveguide to a second optical waveguide, without converting the light in the $TE_0$ mode, converts light in a $TM_0$ mode from the first optical waveguide into light in the $TE_0$ mode, and launches the converted light in the $TE_0$ mode to a third optical waveguide;
   an optical multiplexing and branching section that is connected to the second optical waveguide and the third optical waveguide, multiplexes light from the second optical waveguide and light from the third optical waveguide into one multiplexed light component, and branches the multiplexed light component into a light component to be input to a fourth optical waveguide and a light component to be input to a fifth optical waveguide;
   a phase modulation section that is provided in at least one of the fourth optical waveguide and the fifth optical waveguide and is configured to modulate a phase of guided light using an electric signal; and
   an optical multiplexing section that is connected to the fourth optical waveguide and the fifth optical waveguide and multiplexes light components from the fourth optical waveguide and the fifth optical waveguide into one light component.

2. The optical integrated circuit according to claim 1, wherein the mode conversion and branching section comprises:
   a mode conversion section that is connected to the output end of the first optical waveguide and converts the light in the $TM_0$ mode from the first optical waveguide into light in a $TE_n$ mode; and
   a mode branching section that is provided in a stage behind the mode conversion section, launches light in the $TE_0$ mode from the mode conversion section to the second optical waveguide, without converting the light in the $TE_0$ mode, and launches the light in the $TE_n$ mode from the mode conversion section to the third optical waveguide, thereby converting the light in the $TE_n$ mode into light in the $TE_0$ mode;
   n is a natural number.

3. The optical integrated circuit according to claim 1, further comprising:
   a phase adjustment section that is provided in at least one of the second optical waveguide and the third optical waveguide and adjusts a phase of light to be input to the optical multiplexing and branching section.

4. The optical integrated circuit according to claim 3, further comprising:
   a monitoring section that detects a photocurrent generated in the phase modulation section.

5. The optical integrated circuit according to claim 4, further comprising:
   a bias power supply and a ground electrode that are electrically connected to the phase modulation section, wherein the monitoring section is provided between the phase modulation section and the bias power supply or between the phase modulation section and the ground electrode.

6. The optical integrated circuit according to claim 4, further comprising:
   a feedback mechanism that performs feedback control for a DC voltage or a DC current applied to the phase adjustment section according to the intensity of the photocurrent detected by the monitoring section.

7. The optical integrated circuit according to claim 1, wherein an optical path length of the second optical waveguide is different from an optical path length of the third optical waveguide.

8. The optical integrated circuit according to claim 1, wherein the optical multiplexing section comprises at least one output end, and
   in a case in which the first optical waveguide guides continuous light, an optical signal that is modulated by the phase modulation section is output from the at least one output end of the optical multiplexing section.

9. The optical integrated circuit according to claim 1, wherein the optical multiplexing section comprises at least two output ends, and
   in a case in which the first optical waveguide guides an optically modulated optical signal, one of the output ends of the optical multiplexing section is selected and an optical signal that is modulated by the phase modulation section is output from the selected output end.

* * * * *